United States Patent
Gregory et al.

[11] Patent Number: 5,296,023
[45] Date of Patent: Mar. 22, 1994

[54] PHTHALOCYANINE COLORANTS AND THEIR USE IN INK JET PRINTING

[75] Inventors: Peter Gregory, Bolton; Ronald W. Kenyon, Fallsworth, both of England

[73] Assignee: Zeneca Limited, London, England

[21] Appl. No.: 6

[22] Filed: Jan. 4, 1993

[30] Foreign Application Priority Data

Mar. 6, 1992 [GB] United Kingdom ............... 9204903

[51] Int. Cl.$^5$ ............................................. C09D 11/00
[52] U.S. Cl. .................................. 106/22 D; 106/230; 106/410; 106/413; 540/130; 540/133; 540/134; 540/135
[58] Field of Search ................... 106/22 D, 23 D, 410, 106/413; 540/130, 133, 134, 135

[56] References Cited

U.S. PATENT DOCUMENTS

| | | | |
|---|---|---|---|
| 4,069,064 | 1/1978 | Nett et al. | 106/22 D |
| 4,171,309 | 10/1979 | Wheeler | 106/410 |
| 4,199,509 | 4/1980 | Irvine et al. | 106/23 D |
| 4,205,995 | 6/1980 | Wheeler et al. | 106/413 |
| 4,278,601 | 7/1981 | Wheeler et al. | 106/23 D |
| 4,632,703 | 12/1986 | Koike et al. | 106/22 D |
| 4,732,615 | 3/1988 | Kawashita et al. | 106/22 D |
| 4,735,657 | 4/1988 | Baxter et al. | 106/23 D |
| 4,864,324 | 9/1989 | Shirota et al. | 106/22 D |
| 5,123,960 | 6/1992 | Shirota et al. | 106/22 D |

FOREIGN PATENT DOCUMENTS 468649 1/1992 European Pat. Off. .
1-126381 5/1989 Japan .

*Primary Examiner*—Helene Klemanski
*Attorney, Agent, or Firm*—Cushman, Darby & Cushman

[57] ABSTRACT

A colorant of Formula (1):

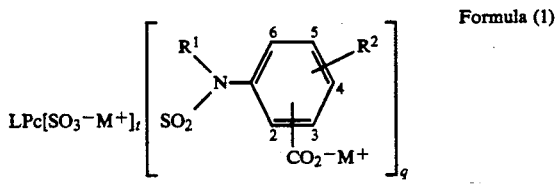

Formula (1)

wherein:
L is a metal cation or hydrogen;
Pc is a phthalocyanine radical having a valency from 3 to 4;
$R^1$ is H, alkyl, substituted alkyl, alkenyl, substituted alkenyl, aralkyl or substituted aralkyl;
$R^2$ is H, alkyl, alkoxy, halo or an optionally substituted amino group;
$M^+$ is $NH_4^+$ or a substituted annonium cation; and
(t+q) is from 3 to 4 inclusive;
with the proviso that the group $CO_2-M^+$ is at the 2-, 3-, 5- or 6-position in Formula (1).

12 Claims, No Drawings

PHTHALOCYANINE COLORANTS AND THEIR USE IN INK JET PRINTING

This invention concerns phthalocyanine compounds, inks, their preparation and use.

Japanese Patent Specification JP 1126381A describes copper phthalocyanine dyes of the Formula (A):

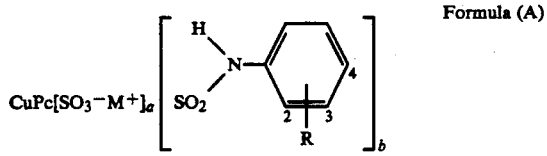

Formula (A)

wherein:

R is $-COOM$, $-(CH_2)_nCOOM$, $-O(CH_2)_nCOOM$ or $-NH(CH_2)_nCOOM$ in which n is 1 or 2;

$M^+$ is $H^+$, $Li^+$, $K^+$, $Na^+$, quaternary ammonium or an organic amine;

a is 0, 1 or 2;

b is 4 when a=0, or is 3 when a=1, or is 2 when a=2.

It has now been found that certain colorants related to those of Formula (A) wherein R is selected to be $-CO_2-M^+$ and is not at the 4-position, and $M^+$ is $NH_4^+$ or substituted ammonium, have particularly good water fastness properties when printed on paper.

According to the present invention there is provided a colorant of Formula (1):

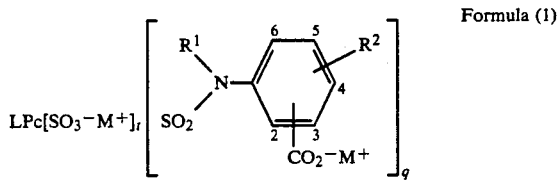

Formula (1)

wherein:

L is a metal cation or hydrogen;

Pc is a phthalocyanine radical having a valency from 3 to 4;

$R^1$ is H, alkyl, substituted alkyl, alkenyl, substituted alkenyl, aralkyl or substituted aralkyl;

$R^2$ is H, alkyl, alkoxy, halo or an optionally substituted amino group;

$M^+$ is $NH_4^+$ or a substituted ammonium cation; and (t+q) is from 3 to 4 inclusive;

with the proviso that the group $CO_2-M^+$ is at the 2-, 3-, 5- or 6-position in Formula (1).

L is hydrogen (i.e., $H_2$) or preferably a lithium, sodium, potassium, magnesium, calcium, barium, aluminium, silicon, tin, lead or rhodium cation, more preferably a scandium, titanium, vanadium, chromium, manganese, iron, cobalt or zinc cation, especially nickel and more especially a copper cation. When L is a tri- or tetravalent metal cation the valencies above 2 may be taken by coordination with halogen atoms or oxygen e.g. VO, AlCl, $PbCl_2$.

$R^1$ is preferably $C_{3-4}$-alkenyl; optionally substituted $C_{7-11}$-aralkyl, especially benzyl; optionally substituted $C_{1-4}$-alkyl, especially $C_{1-4}$-alkyl or hydroxy-$C_{1-4}$-alkyl; or more preferably H.

In one embodiment the group $CO_2-M^+$ is at the 2- or 3-position in Formula (1).

$R^2$ is preferably H; $C_{1-4}$-alkyl, especially methyl; $C_{1-4}$-alkoxy, especially methoxy; chloro; or an optionally substituted amino group of formula $-NX^1X^2$ wherein $X^1$ and $X^2$ are each independently H, optionally substituted alkyl or optionally substituted aryl. When $X^1$ or $X^2$ is optionally substituted alkyl it is preferably $C_{1-18}$-alkyl, more preferably $C_{1-6}$-alkyl. When $X^1$ or $X^2$ is optionally substituted aryl it is preferably optionally substituted phenyl, especially phenyl or phenyl having 1 or 2 substituents selected from $C_{1-12}$-alkyl, $C_{1-12}$-alkoxy, halo and carboxy.

As examples of optionally substituted amino groups there may be mentioned n-hexylamino, N,N-di-n-butylamino, phenylamino, methylamino, dimethylamino, diethylamino, dipropylamino, ethylamino, n-propylamino, n-butylamino, n-octylamino and 3-carboxyphenylamino.

The sum of (t+q) is preferably 4. It is also preferred that t is at least 0.5, preferably from 0.5 to 2, especially approximately 1. It is particularly preferred that q is greater than or equal to t. As will be appreciated the value of (t+q) is an average value and the definition provided for the invention includes single compounds and compositions.

The substituted ammonium cation may be a quaternary ammonium group of the formula $+NQ_4$ in which each Q independently is an organic radical, or two or three Qs together with the nitrogen atom to which they are attached form a heterocyclic ring and all remaining Qs are selected from $C_{1-4}$-alkyl. Preferred organic radicals represented by Q are $C_{1-4}$-alkyl radicals, especially methyl radicals. Preferred heterocyclic rings formed by $NQ_4$ are 5 or 6 membered heterocyclic rings.

As examples of quaternary ammonium groups of formula $+NQ_4$ there may be mentioned $N^+(CH_3)_4$, $N^+(CH_2CH_3)_4$, N-methyl pyridinium, N,N-dimethyl piperidinium and N,N-dimethyl morpholinium.

Alternatively the substituted ammonium cation may be a group of formula $+NHT_3$ wherein each T independently is H or $C_{1-4}$-alkyl provided at least one T is $C_{1-4}$-alkyl, or two or three groups represented by T together with the nitrogen atom to which they are attached form a 5 or 6 membered ring, especially a pyridine, piperidine or morpholine ring. It is preferred that the substituted ammonium cation is derived from an amine which is volatile under ambient conditions, i.e. at 20° C. and atmospheric pressure.

As examples of groups of formula $+NHT_3$ there may be mentioned $(CH_3)_3N^{30}$ H, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $CH_3CH_2CH_2N^+H_3$, $(CH_3)_2CHN^+H_3$, pyridinium, piperidinium and morpholinium.

The surprisingly high water fastness of colorants according to the present invention is illustrated by a comparison of Examples 1 and 3 wherein the $-CO_2-NH_4^+$ groups are attached to the benzene ring at the 2- and 3-position respectively, with Comparative Example (A) wherein the $CO_2-NH_4^+$ group is attached to the benzene ring at the 4-position; the first two dyes have water fastness figures of over 70% on plain paper whereas the latter has a water fastness figure of 51% under identical conditions.

Comparison of the water fastness of Example 1 with Comparative Example (B) and of Examples 1 to 6 with Comparative Examples (C) and (D) further illustrate the surprisingly high water fastness of the present compounds.

According to a further aspect of the present invention there is provided a process for the preparation of a colorant of Formula (1) which comprises condensing a compound or composition of formula $LPc(SO_2Cl)_{t+q}$ with a compound of Formula (2) in the presence of a base and, if necessary, converting any sulpho and carboxy groups into their $NH_4^+$ or substituted ammonium salts:

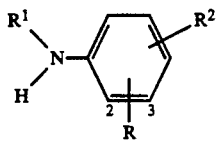
(2)

wherein:
$R^1$, $R^2$, L, Pc and $t+q$ are as hereinbefore defined; and R is a carboxy group at the 2-, 3-, 5- or 6-position.

The base may be any inorganic or organic base such as an alkali metal or alkali earth metal hydroxide, carbonate or bicarbonate, but is preferably an organic base.

Preferred organic bases are tertiary amines such as N-alkylated heterocycles, for example N-($C_{1-4}$-alkyl)-morpholine, N-($C_{1-4}$-alkyl)piperidine, and N,N-di($C_{1-4}$-alkyl)piperazine; tri($C_{1-4}$-alkyl)amines, for example triethylamine; and optionally substituted pyridines, especially pyridine which has been found to give colorants of Formula (1) with particularly good properties. The amount of base used may be varied between wide limits but it is preferred to use less than 40, more preferably less than 10 and especially from 3 to 5 moles for each mole of the compound or composition of formula $LPc(SO_2Cl)_{t+q}$.

The condensation is preferably performed using water as solvent. Ambient temperatures may be employed in conjunction with a reaction time of, for example, 5–24 hours, or elevated temperatures can be used for a shorter period.

After the condensation the product may be isolated by acidifying the reaction mixture, preferably using a mineral acid, especially hydrochloric acid. Where the product precipitates as a solid it may be separated from the mixture by filtration.

If desired unwanted anions may be removed from the product of the above process by dialysis, reverse osmosis, ultrafiltration or a combination thereof.

The product of the above process may be converted, where necessary, to the $NH_4^+$ quaternary ammonium or organic amine salt by the addition of ammonia, ammonium hydroxide, primary, secondary, tertiary or quaternary amine. When the base used in the process is an organic amine an excess may be used so that carboxy and sulpho groups in the compound of Formula (1) automatically result as their organic amine salt.

The metal-free and metal-containing phthalocyanine having up to four sulpho groups sulphonyl halides may be prepared using methods known per se. It is preferred that the phthalocyanine sulphonyl halide is prepared by heating a metal-free or metal-containing phthalocyanine having up to four sulpho groups with chlorosulphonic acid, optionally followed by heating with $PCl_3$ - Typically the heating with chlorosulphonic acid is performed above 60° C., preferably above 100° C., especially in the range 120° C. to 165° C., preferably over a period of from 1 to 24 hours. Heating with $PCl_3$ is preferably performed at a lower temperature, especially 80°–105° C., over a period of 10 to 48, preferably 10 to 30 hours.

As will be appreciated the metal-free and metal-containing phthalocyanine sulphonyl halide used in the above process is a compound or composition of formula LPc having from 3 to 4 sulphonyl halide substituents wherein L and Pc are as hereinbefore defined.

Examples of compounds of Formula (2) which may be used in the above process include 2-aminobenzoic acid, 3-aminobenzoic acid, 3-amino-4-methoxybenzoic acid, 3-amino-4-methylbenzoic acid and mixtures thereof.

The ratio of t:q may be varied by selection of appropriate amounts of the aminobenzoic acid used in the process or by varying the reaction time, temperature or base as desired. For example, as the reaction time, temperature and amount of the aminobenzoic acid increases relative to the amount of the phthalocyanine sulphonyl-halide so does the ratio of q to t.

The value to t and q in Formula (1) may be determined by elemental analysis.

The product of the above process forms a further feature of the present invention.

The compounds of Formula (1) are especially useful for the preparation of inks, especially aqueous inks, and for ink jet printing, particularly thermal ink jet printing. The inks can be prepared analogously to known formulations.

A preferred ink comprises a compound according to the present invention and a liquid medium, preferably an aqueous medium. It is preferred that the compound is completely dissolved in the liquid medium to form a solution.

The ink preferably contains from 0.5% to 20%, more preferably from 0.5% to 15%, and especially from 1% to 5%, by weight of the compound, based on the total weight of the ink.

The liquid medium is preferably water or a mixture comprising water and a water-soluble organic solvent, preferably in a weight ratio from 99:1 to 1:99, more preferably from 95:1 to 50:50 and especially from 90:10 to 60:40.

The water-soluble organic solvent is preferably a $C_{1-4}$-alkanol such as methanol, ethanol, n-propanol, isopropanol, n-butanol, sec-butanol, tert-butanol or isobutanol; an amide such as dimethylformamide or dimethylacetamide; a ketone or ketone alcohol such as acetone or diacetone alcohol; an ether such as tetrahydrofuran or dioxane; a polyalkylene glycol such as polyethylene glycol or polypropylene glycol; an alkylene glycol or thioglycol containing a $C_2$–$C_6$ alkylene group such as ethylene glycol, propylene glycol, butylene glycol or triethylene glycol; a thiodiglycol, hexylene glycol, or diethylene glycol; a polyol such as glycerol or 1,2,6-hexanetriol; a lower alkyl ether of a polyhydric alcohol such as 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)ethoxy]-ethanol; 2-pyrrolidone or N-methylpyrrolidone; or a mixture containing two or more of the aforementioned water-soluble organic solvents.

Preferred water-soluble organic solvents are selected from 2-pyrrolidone, N-methylpyrrolidone, an alkylene glycol or lower alkyl ether of a polyhydric alcohol such as ethylene glycol, diethylene glycol, triethylene glycol or 2-methoxy-2-ethoxy-2-ethoxyethanol; and a polyethylene glycol with a molecular weight of up to 500. A preferred specific solvent mixture is a binary mixture of water and either diethylene glycol, 2-pyrrolidone or N-methylpyrrolidone in a weight ratio as mentioned above.

Examples of suitable ink media are given in U.S. Pat. No. 4,963,189, U.S. Pat. No. 4,703,113, U.S. Pat. No. 4,626,284, and EP 4,251,50A.

It is preferred that the inks of the present invention further comprise one or more of a penetrant to assist permeation of the dye into a paper substrate, a kogation-reducing agent to prevent or reduce the build-up of residue (koga) on the resistor surface in thermal ink jet printers and a buffer such as sodium borate, to stabilise the pH of the ink.

The kogation-reducing agent is preferably an oxo anion, such as described in EP 425150A. The oxo-anion may be $C_2O_4^{2-}$, $SO_3^{2-}$, $SO_4^{2-}$, molybdate, $AsO_4^{3-}$ or more preferably a phosphate ester, a diorganophosphate or more especially a phosphate salt which is particularly effective in reducing kogation.

As examples of phosphate salts there may be mentioned dibasic phosphate ($HPO_4^{2-}$) monobasic phosphates ($H_2PO_4^-$) and polyphosphates ($P_2O_7^{4-}$). The selection of counter ion is not believed to be critical and examples include alkali metals, ammonium and alkylammonium cations.

The kogation-reducing agent is preferably present in the ink at a concentration from 0.001% to 15%, based on oxo-anion, and more preferably from 0.01% to 1% (by weight).

A further aspect of the present invention provides a process for printing a substrate with an ink using an ink jet printer, characterised in that the ink contains at least one colorant according to the first aspect of the present invention.

A suitable process for the application of an ink as hereinbefore defined comprises forming the ink into small droplets by ejection from a reservoir through a small orifice so that the droplets of ink are directed at a substrate. This process is commonly referred to as ink jet printing, and the ink jet printing processes for the present inks are preferably piezoelectric ink jet printing, and more especially thermal ink jet printing. In thermal ink jet printing, programmed pulses of heat are applied to the ink by means of a resistor, adjacent to the orifice during relative movement between the substrate and the reservoir.

A preferred substrate is an overhead projector slide or a cellulosic substrate, especially plain paper, which may have an acid, alkaline or neutral character.

The preferred ink used in the process is as hereinbefore described.

According to a still further aspect of the present invention there is provided a paper or an overhead projector slide printed with a compound according to the invention.

The colorant of the present invention may be used in admixture with other colorants and inks or separately with other colorants and inks in an ink jet printer to give a printer capable of printing a variety of colours and shades. Suitable other colorants and inks for use with the invention are described in GB Patent application 9204898.2, EP 468647 A1, EP 468648 A1 and EP 468649 A1.

The invention is further illustrated by the following examples in which all parts and percentages are by weight unless otherwise indicated.

EXAMPLE 1

Preparation of the ammonium salt of a compound of Formula (3) in which A is 2-carboxy and $R^2$ is H

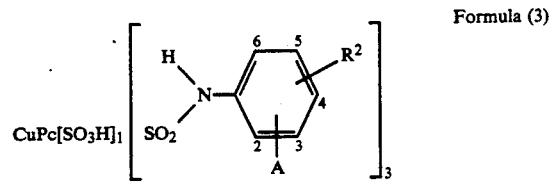

Formula (3)

Copper phthalocyanine tetrasulphonic acid (50 g) was added slowly to chlorosulphonic acid (220 g) at a temperature below 40° C. The mixture was then heated at 120°–125° C. for 4 hours and then cooled to 0° C. Phosphorus trichloride (46 g) was added and the mixture heated at 90°–95° C. for 18 hours. After cooling to 20° C. the mixture was added to stirred ice/water (3 kg) stirred for 1 hour and the phthalocyanine sulphonyl chloride filtered off and pulled dry.

The phthalocyanine sulphonyl chloride was added to a mixture of water (480 ml), pyridine (120 ml) and o-aminobenzoic acid (45.6 g) and stirred at 20°–25° C. for 12 hours. The pH was adjusted to 2 with concentrated hydrochloric acid and the product in free acid form filtered off and washed with acetone (1800 ml). Elemental analysis of the product indicated that it was of formula (3).

The product was added to water (900 ml) and the pH adjusted to 9–9.5 with concentrated ammonium hydroxide. The solution was dialysed to remove chloride ions, screened and evaporated to dryness to give the ammonium salt of the product in a yield of 30.9 g.

When made into an ink by dissolution in water/diethylene glycol (92.5/7.5) and printed onto plain paper using a thermal ink jet machine the ammonium salt of the product gave bright strong cyan shades showing a good water fastness figure of 76%.

Water fastness figures in all examples were measured using the following procedure:

A sample of the subject compound is dissolved in water/diethylene glycol (92.5/7.5) to give an ink. The ink is printed in the shape of a square, on plain paper, and the optical density of the print determined using a densitometer. The printed paper is then stirred in water at ambient temperature for five minutes, removed from the water, dried, and the optical density again measured using a densitometer. Water fastness figures are expressed as a percentage according to the calculation:

$$\frac{\text{Optical density after stirring in water}}{\text{Optical density before stirring in water}} \times 100\%$$

Further inks containing the title dye may be prepared according to the following formulations shown in Table I and Table II wherein figures denote parts by weight for each stated component:

The following abbreviations are used:
PG = propylene glycol,
DEG = diethylene glycol,
NMP = N-methyl pyrollidone,
DMK = dimethylketone,
IPA = isopropanol,
MEOH = methanol,
2P = 2-pyrollidone, MIBK = methylisobutyl ketone,
P12 = Propane-1,2-diol,
BDL = Butane-2,3-diol,
CET = Cetyl ammonium bromide (a surfactant),
BAS = 1:1 mixture by weight of ammonia and methylamine,
PHO = Na₂HPO₄, and
TBT = Tertiary butanol.

nium hydroxide. The solution was dialysed to remove chloride ions, screened and evaporated to dryness to give the title compound as the ammonium salt.

When made into an ink by dissolution in water/diethylene glycol (92.5/7.5) and printed onto plain paper using a thermal ink jet machine the title compound gave a bright strong cyan shade with a water fastness figure of 74%.

TABLE I

| Ink No. | Dye Content | Water | PG | DEG | NMP | DMK | NaOH | Na Stearate | IPA | MEOH | 2P | MIBK | BAS |
|---|---|---|---|---|---|---|---|---|---|---|---|---|---|
| 1 | 2.0 | 80 | 5 |  | 6 | 4 |  |  |  |  | 5 |  | 3 |
| 2 | 3.0 | 90 |  | 5 | 2 |  | 0.2 |  |  |  |  |  |  |
| 3 | 1.0 | 85 | 5 |  | 2 | 2 |  | 0.1 |  | 5 | 1 |  |  |
| 4 | 2.1 | 91 |  | 8 |  |  |  |  |  |  |  | 1 |  |
| 5 | 3.1 | 86 | 5 |  |  |  |  | 0.2 | 4 |  |  | 5 |  |
| 6 | 1.1 | 81 |  |  | 9 |  | 0.5 | 0.5 |  | 9 |  |  |  |
| 7 | 2.5 | 60 | 4 | 15 | 3 | 3 |  |  | 6 | 10 | 5 | 4 |  |
| 8 | 1.9 | 70 |  | 20 |  |  |  |  | 10 |  |  |  |  |
| 9 | 2.4 | 75 | 5 | 4 |  |  |  |  |  | 6 |  | 5 | 5 |
| 10 | 4.1 | 80 | 3 | 5 | 2 | 10 |  | 0.3 |  |  |  |  |  |
| 11 | 3.2 | 65 |  | 5 | 4 | 6 |  |  | 5 | 4 | 6 | 5 |  |
| 12 | 4.6 | 96 |  |  |  |  |  |  |  | 4 |  |  |  |
| 13 | 0.8 | 90 | 5 |  |  |  |  |  | 5 |  |  |  |  |
| 14 | 1.2 | 80 | 2 | 6 | 1 | 5 |  |  | 1 |  | 4 |  | 1 |
| 15 | 1.8 | 80 |  | 5 |  |  |  |  |  |  | 15 |  |  |
| 16 | 2.6 | 84 |  |  | 11 |  |  |  |  |  | 5 |  |  |
| 17 | 3.3 | 80 | 2 |  |  | 10 |  |  |  | 2 |  | 6 |  |
| 18 | 1.7 | 90 |  |  | 7 |  | 0.3 |  | 3 |  |  |  |  |
| 19 | 1.5 | 69 | 2 | 20 | 2 | 1 |  |  |  |  |  | 3 | 3 |
| 20 | 1.6 | 91 |  |  | 4 |  |  |  |  |  | 4 |  | 1 |

TABLE II

| Ink No. | Dye Content | Water | PG | DEG | NMP | CET | TBT | Na Stearate | BDL | PHO | 2P | PI2 |
|---|---|---|---|---|---|---|---|---|---|---|---|---|
| 21 | 3.0 | 80 | 15 |  |  | 0.2 |  |  |  |  | 5 |  |
| 22 | 2.0 | 90 |  | 5 |  |  |  |  |  | 1.2 |  | 5 |
| 23 | 1.5 | 85 | 5 | 5 |  | 0.15 | 5.0 | 0.2 |  |  |  |  |
| 24 | 2.5 | 90 |  | 6 | 4 |  |  |  |  | 0.12 |  |  |
| 25 | 3.1 | 82 | 4 | 8 |  | 0.3 |  |  |  |  |  | 6 |
| 26 | 0.9 | 85 |  | 10 |  |  |  |  | 5 | 0.2 |  |  |
| 27 | 1.5 | 90 |  | 5 | 5 |  |  | 0.3 |  |  |  |  |
| 28 | 2.9 | 70 |  | 10 | 4 |  |  |  | 1 |  | 4 | 11 |
| 29 | 2.2 | 75 | 4 | 10 | 3 |  |  |  | 2 |  | 6 |  |
| 30 | 2.6 | 91 |  |  | 6 |  |  |  |  |  | 3 |  |
| 31 | 3.2 | 76 |  | 9 | 7 |  | 3.0 |  |  | 0.95 | 5 |  |
| 32 | 4.0 | 78 | 5 | 11 |  |  |  |  |  |  | 6 |  |
| 33 | 3.3 | 86 |  |  | 7 |  |  |  |  |  | 7 |  |
| 34 | 1.1 | 70 | 5 | 5 | 5 | 0.1 | 0.2 | 0.1 | 5 | 0.1 | 5 | 5 |

EXAMPLE 2

Preparation of the ammonium salt of a compound of Formula (3) in which A is 3-carboxy and $R^2$ is 6-methoxy Copper phthalocyanine (45 g) was added slowly to chlorosulphonic acid (219 g) at a temperature below 60° C. The mixture was heated at 135°–145° C. for 3 hours and then cooled to 45° C. Phosphorus trichloride (23.7 g) was added and the mixture heated at 90°–95° C. for 18 hours. After cooling to 20° C. the mixture was added to stirred ice/water (600 g) and stirred for 15 minutes. The phthalocyanine sulphonyl chloride was filtered off, washed with ice/water (400 ml) and pulled dry.

The phthalocyanine sulphonyl chloride was added to a mixture of water (120 ml), pyridine (90 ml) and 3-amino-4-methoxybenzoic acid (13.2 g) and stirred at 20°–25° C. for 12 hours. The pH was adjusted to 2 with concentrated hydrochloric acid and the title product in free acid form filtered off and pulled dry. The free acid form of the title compound was added to water (450 ml) and the pH adjusted to 9–9.5 with concentrated ammonium hydroxide.

Further inks may be prepared according to the formulations described in Example 1, Tables I and II, except that in place of the dye from Example 1 there is used an equivalent amount of the dye from Example 2.

EXAMPLE 3

Preparation of the ammonium salt of a compound of Formula (3) in which A is 3-carboxy and $R^2$ is H Method (a)

In place of the 45.6 g of o-aminobenzoic acid used in Example 1 there was used 45.6 g of m-aminobenzoic acid.

Method (b)

The method of Example 2 was repeated except that in place of 3-amino-4-methoxybenzoic acid there was used 3-aminobenzoic acid.

When the title compound was made into an ink by dissolution in water/diethylene glycol (92.5/7.5) and printed onto plain paper using a thermal ink jet printing machine it gave bright strong cyan shades with a good water fastness figure of 79%.

Further inks may be prepared according to the formulations described in Example 1, Tables I and II, except that in place of the dye from Example 1 there is used an equivalent amount of the dye from Example 3.

EXAMPLE 4

Preparation of the ammonium salt of a compound of Formula (3) in which A is 3-carboxy and $R^2$ is 6-methyl In place of the 13.2 g of 3-amino-4-methoxybenzoic acid used in Example 2 there is used 12.45 g of 3-amino-4-methylbenzoic acid.

When the title compound was made into an ink by dissolution in water/diethylene glycol (92.5/7.5) and printed onto plain paper using a thermal ink jet printing machine it gave bright strong cyan shades with a good water fastness figure of 66%.

Further inks may be prepared according to the formulations described in Example 1, Tables I and II, except that in place of the dye from Example 1 there is used an equivalent amount of the dye from Example 4.

EXAMPLE 5

Preparation of the tetramethylammonium salt of a compound of Formula (3) in which A is 3-carboxy and $R^2$ is H The product of Example 3 in the free acid form was added to water (900 ml) and the pH adjusted to 9-9.5 with tetramethylammonium hydroxide. The solution was dialysed to remove chloride ions, screened and evaporated to give the title product as the tetramethylammonium salt.

When made into an ink by dissolution in water/diethylene glycol (92.5/7.5) and printed onto plain paper using a thermal ink jet printer the title compound gave bright cyan shades showing a water fastness figure of 81%.

Examples of further inks including the title dye are:

| Ink | Dye Content (parts) | Liquid Medium and Other Components (parts) |
|---|---|---|
| 1 | 2.5 | Water (90) Pyrrolidone (10) Ammonium Phosphate (0.2) |
| 2 | 1.2 | Water (85) Diethylene Glycol (15) Dimethyl Phosphate (0.3) Monomethyl Phosphate (0.2) |
| 3 | 3.0 | Water (90) Diethylene Glycol (10) Sodium Borate (0.2) |

Further inks may be prepared according to the formulations described in Example 1, Tables I and II, except that in place of the dye from Example 1 there is used an equivalent amount of the dye from Example 5.

EXAMPLE 6

Preparation of the methylammonium salt of a compound of Formula (3) in which A is 3-carboxy and $R^2$ is H The method of Example 5 was followed except that in place of the tetramethylammonium hydroxide there was used a 50% solution of methylamine.

When made into an ink and printed onto plain paper using a thermal ink jet printer the title product gave bright cyan shades with a water fastness figure of 78%.

Further inks may be prepared according to the formulations described in Example 1, Tables I and II, except that in place of the dye from Example 1 there is used an equivalent amount of the dye from Example 6.

EXAMPLE 7

Preparation of the dimethylamine salt of the compound of Formula (3) in which A is 3-carboxy and $R^2$ is H The method of Example 5 was followed except that in place of the tetramethylammonium hydroxide there was used a 40% aqueous solution of dimethylamine.

When made into an ink and printed onto plain paper using a thermal ink jet printer the title product gave bright cyan shades with a water fastness figure of 76%.

Further inks may be prepared according to the formulations described in Example 1, Tables I and II, except that in place of the dye from Example 1 there is used an equivalent amount of the dye from Example 7.

EXAMPLE 8

Preparation of the ethylamine salt of the compound of Formula (3) in which A is 3-carboxy and $R^2$ is H The method of Example 5 was followed except that in place of the tetramethylammonium hydroxide there was used a 70% aqueous solution of ethylamine.

When made into an ink and printed onto plain paper sing a thermal ink jet printer the title compound gave bright cyan shades with a water fastness figure of 75%.

Further inks may be prepared according to the formulations described in Example 1, Tables I and II, except that in place of the dye from Example 1 there is used an equivalent amount of the dye from Example 8.

EXAMPLE 9

Preparation of the ammonium salt of the compound of Formula (3) in which A is 3-carboxy and $R^2$ is 4-phenylamino The method of Example 2 was follows except that in place of the 13.2 g of 3-amino-4-methoxybenzoic acid there was used 18.6 g of 5-amino-2-phenylaminobenzoic acid and in place of the mixture of water (120 ml) and pyridine (90 ml) there was used a mixture of water (300 ml) and pyridine (300 ml).

The title compound was converted to the free acid form, added to water (500 ml) and the pH adjusted to 9.0 by addition of ammonium hydroxide solution. The ammonium salt of the dye was isolated by adding 50 g of ammonium chloride and the precipitated product filtered off. The product was redissolved in water and the pH adjusted to 9.0 using ammonium hydroxide, dialysed, screened and evaporated as in Example 2.

When made into an ink by dissolution in water/diethylene glycol (92.5/7.5) and printed onto plain paper using a thermal ink jet printer, the title product gave cyan shades with a water fastness figure of 92%.

Further inks may be prepared according to the formulations described in Example 1, Tables I and II, except that in place of the dye from Example 1 there is used an equivalent amount of the dye from Example 9.

EXAMPLE 10

Preparation of the ammonium salt of a compound of Formula (3) in which A is 3-carboxy and $R^2$ is 4-n-hexylamino The method of Example 9 was followed except that in place of 5-amino-2-phenylaminobenzoic acid (18.6 g) there was used 5-amino-2-n-hexylaminobenzoic acid (19.2 g) and in place of the mixture of water (300 ml)

and pyridine (300 ml) there was used a mixture of water (120 ml) and pyridine (600 ml).

When the title compound was made into an ink by dissolution in water/diethylene glycol (92.5/7.5) and printed onto plain paper using a thermal ink jet printer the title product gave cyan shades with a water fastness of 92%.

Further inks may be prepared according to the formulations described in Example 1, Tables I and II, except that in place of the dye from Example 1 there is used an equivalent amount of the dye from Example 10.

EXAMPLE 11

Preparation of the ammonium salt of a compound of Formula (2) in which A is 3-carboxy and $R^2$ is 4-N,N-di-n-butylamino The method of Example 9 was followed except that in place of 5-amino-2-phenylaminobenzoic acid (18.6 g) there was used 5-amino-2-N,N-di-n-butylaminobenzoic acid (21.8 g) and in place of the mixture of water (300 ml) and pyridine (300 ml) there was used a mixture of water (120 ml) and pyridine (30 ml).

When printed onto plain paper using a thermal ink jet printer the title product gave cyan shades with a water fastness of 67%.

Further inks may be prepared according to the formulations described in Example 1, Tables I and II, except that in place of the dye from Example 1 there is used an equivalent amount of the dye from Example 11.

COMPARATIVE EXAMPLE (A)

Preparation of the ammonium salt of a compound of Formula (3) in which A is 4-carboxy and $R^2$ is H In place of the 45.6 g of o-aminobenzoic acid used in Example 1 there was used 45.6 g of p-aminobenzoic acid. When the title compound was made into an ink by dissolution in water/diethylene glycol (92.5/7.5) and printed onto plain paper using a thermal ink jet printing machine it gave bright cyan shades but with a water fastness figure of 51% which is inferior to Examples 1 and 3.

COMPARATIVE EXAMPLE (B)

Preparation of the compound of Formula (3) in which A is 4-OCH$_2$-CO$_2$—NH$_4^+$ and $R^2$ is H In place of the 45.6 g of o-aminobenzoic acid used in Example 1 there was used 50.1 g of 4-aminophenoxyacetic acid. When printed onto plain paper using a thermal ink jet printing machine it gave cyan shades with much inferior water fastness than Examples 1 and 3 (56%).

COMPARATIVE EXAMPLE (C)

Preparation of the ammonium salt of a compound of Formula (3) in which A 4-carboxy and $R^2$ is 6-methyl In place of the 45.6 g of o-aminobenzoic acid used in Example 1 there was used 50.3 g of 4-amino-3-methylbenzoic acid. When the title compound was made into an ink by dissolution in water/diethylene glycol (92.5/7.5) and printed onto plain paper using a thermal ink jet printing machine it gave cyan shades but with a water fastness figure of 50% which is inferior when compared with Examples 1 and 3.

COMPARATIVE EXAMPLE (D)

In place of the 45.6 g of o-aminobenzoic acid used in Example 1 there was used 24.9 g of glycine. When the product was made into an ink and printed onto plain paper using a thermal ink jet printing machine it gave cyan shades with a water fastness figure of 34% which is inferior when compared with Examples 1 and 3.

We claim:

1. A colorant of Formula (1):

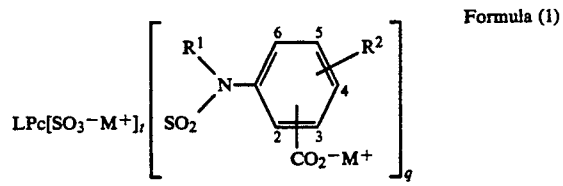

wherein:
L is a metal cation or hydrogen;
Pc is a phthalocyanine radical having a valency from 3 to 4;
$R^1$ is H, alkyl, substituted alkyl, alkenyl, substituted alkenyl, aralkyl or substituted aralkyl;
$R^2$ is H, alkyl, alkoxy, halo or an optionally substituted amino group;
$M^+$ is $NH_4^+$ or a substituted ammonium cation; and
$(t+q)$ is from 3 to 4 inclusive;
with the proviso that the group $CO_2-M^+$ is at the 2-, 3-, 5- or 6-position in Formula (1).

2. A colorant according to claim 1 wherein $R^2$ is H, alkyl, alkoxy or halo.

3. A colorant according to claim 1 wherein the group $CO_2-M^+$ is at the 2- or 3-position in Formula(1).

4. A colorant according to claim 1 wherein L is a nickel or copper cation.

5. A process for the preparation of a colorant according to claim 1 which comprises condensing a compound or composition of formula $LPc(SO_2Cl)_{t+q}$ with a compound of Formula (2) in the presence of a base and, if necessary, converting any sulpho and carboxy groups into their $NH_4^+$ or substituted ammonium salt

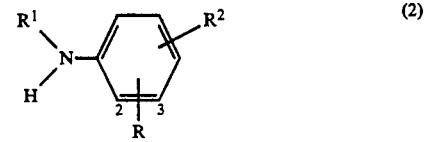

wherein:
$R^1$, $R^2$, L, Pc and $t+q$ are as defined in claim 1; and
R is a carboxy group at the 2-, 3-, 5- or 6-position.

6. A paper or an overhead projector slide printed with a compound according to claim 1.

7. A colorant of Formula (1):

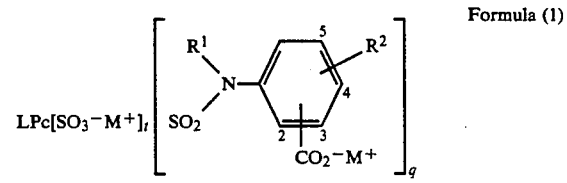

wherein:
L is a copper or nickel cation;
Pc is a phthalocyanine radical having a valency from 3 to 4;

$R^1$ is H, $C_{3-4}$-alkenyl, benzyl, $C_{1-4}$-alkyl or hydroxy $C_{1-4}$-alkyl;

$R^2$ is H, $C_{1-4}$-alkyl, $C_{1-4}$-alkoxy, chloro or an optionally substituted amino group of formula $-NX^1X^2$ wherein $X^1$ and $X^2$ are each independently $C_{1-18}$-alkyl, phenyl or phenyl having 1 or 2 substituents selected from $C_{1-12}$-alkyl, $C_{1-12}$-alkoxy, halo and carboxy;

$M^+$ is $NH_4^+$, $^+NQ_4$ wherein each Q is $C_{1-4}$-alkyl or $^+NHT_3$ wherein each T independently is H or $C_{1-4}$-alkyl provided at least one T is $C_{1-4}$-alkyl; and $(t+q)$ is from 3 to 4 inclusive;

with the proviso that the group $CO_2^-M^+$ is at the 2-, 3-, 5- or 6-position in Formula (1).

8. A colorant according to claim 7 wherein $M^+$ is selected from $NH_4^+$, $N^+(CH_3)_4$, $N^+(CH_2CH_3)_4$, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $CH_3CH_2CH_2N^+H_3$, $(CH_3)_2CHN^+H_3$, pyridinium, piperidinium and morpholinium.

9. An ink comprising a compound according to claim 1 or claim 7 and a liquid medium comprising water and water-soluble organic solvent.

10. A colorant of Formula (4) and salts thereof:

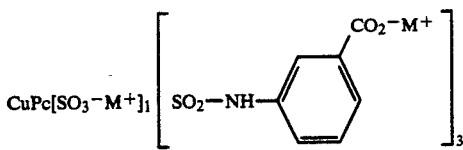

wherein $M^+$ is $NH_4^+$ or a substituted ammonium cation.

11. A colorant according to claim 10 wherein $M^+$ is $NH_4^+$.

12. A process for ink jet printing a substrate with an ink containing at least one colorant according to any one of claims 1–4, 7, 8, 10 or 11, said process comprising forming said ink into small droplets by ejection from a reservoir through a small orifice so that the droplets of the ink are directed at the substrate.

* * * * *